United States Patent [19]
Gallagher

[11] Patent Number: 5,862,922
[45] Date of Patent: *Jan. 26, 1999

[54] VIDEO CASSETTE STORAGE AND DISPLAY RACK

[75] Inventor: Christopher G. Gallagher, Akron, Ohio

[73] Assignee: Fellows Manufacturing Co., Itasca, Ill.

[ * ] Notice: The term of this patent shall not extend beyond the expiration date of Pat. No. 5,636,752.

[21] Appl. No.: 824,158

[22] Filed: Mar. 26, 1997

Related U.S. Application Data

[63] Continuation of Ser. No. 445,219, May 18, 1995, Pat. No. 5,636,752.

[51] Int. Cl.⁶ ............................................. A47F 7/00
[52] U.S. Cl. ................. 211/41.12; 211/194; 206/387.15; 312/9.9; 312/108; 312/205; 312/350
[58] Field of Search ................ 211/41.12, 194, 211/40; 206/387.15, 387.14, 307.1, 308.1; 312/107, 108, 205, 350, 351, 9.9, 9.47, 9.48, 9.51, 9.64

[56] References Cited

U.S. PATENT DOCUMENTS

| | | | |
|---|---|---|---|
| D. 215,944 | 11/1969 | Barecki | D33/19 |
| D. 232,216 | 7/1974 | Milner | D6/190 |
| D. 259,450 | 6/1981 | Veralrud | D3/35 |
| D. 278,112 | 3/1985 | Stanton | D6/407 |
| D. 298,287 | 11/1988 | Stravitz | D6/407 |
| D. 300,287 | 3/1989 | Price | D6/407 |
| D. 307,977 | 5/1990 | Egly et al. | D3/35 |
| D. 318,580 | 7/1991 | Sjostrom | D6/407 |
| D. 320,707 | 10/1991 | Garfinkle | D6/407 |
| D. 344,644 | 3/1994 | Long et al. | D6/407 |
| D. 346,510 | 5/1994 | Long et al. | D6/407 |
| 1,128,031 | 1/1915 | Needleman | |
| 1,453,437 | 5/1923 | Burnham | 211/41 |
| 3,856,369 | 12/1974 | Commiant | 312/107 |
| 4,358,018 | 11/1982 | Wolfe | 211/41 |
| 4,368,934 | 1/1983 | Somers | 206/387.15 X |
| 4,453,785 | 6/1984 | Smith | 206/307.1 X |
| 4,498,595 | 2/1985 | Wilson | 211/194 |
| 4,577,914 | 3/1986 | Stravitz | 206/387.15 X |
| 4,730,735 | 3/1988 | Lechner | 211/41 |
| 4,790,926 | 12/1988 | Mastronardo et al. | 211/40 X |
| 4,832,195 | 5/1989 | Dahl | 206/387.15 |
| 4,850,477 | 7/1989 | Gelardi et al. | 206/387.15 X |
| 4,889,244 | 12/1989 | Hehn | 211/41 |
| 5,105,339 | 4/1992 | Olsson et al. | 211/41 X |
| 5,251,749 | 10/1993 | Knight | 206/387.15 X |
| 5,320,244 | 6/1994 | Yu | 206/387.15 X |
| 5,380,493 | 1/1995 | Chang et al. | 211/41 X |
| 5,427,446 | 6/1995 | Glomski | 206/387.15 X |
| 5,636,752 | 6/1997 | Gallagher | 211/194 X |
| 5,638,962 | 6/1997 | Price | D6/407 X |

FOREIGN PATENT DOCUMENTS

| | | |
|---|---|---|
| 0 277 407 A1 | 8/1988 | European Pat. Off. . |
| 0 289 329 A1 | 11/1988 | European Pat. Off. . |
| 0 455 602 A1 | 11/1991 | European Pat. Off. . |

*Primary Examiner*—Robert W. Gibson, Jr.
*Attorney, Agent, or Firm*—Brinks Hofer Gilson & Lione

[57] ABSTRACT

A storage and display rack for two different sizes of video boxes, whereby the bigger of the two boxes will extend lengthwise in a horizontal orientation in the rack and two of the smaller boxes will extend horizontally widthwise in a side-by-side relationship in the rack, with the front ends of the two different size boxes lying in a common vertical plane. The larger boxes are supported lengthwise horizontally on a plurality of first ribs formed on spaced parallel side walls of the rack and extend only partially toward a back wall of the rack. The smaller boxes are supported horizontally widthwise between second ribs formed on both sides of a center partition and selected first ribs on an adjacent side wall, and extend completely to the back wall of the rack. The rack may be formed of two one-piece sections to provide compactness for shipping, and then snapped together in a vertical stacked relationship for use.

17 Claims, 3 Drawing Sheets

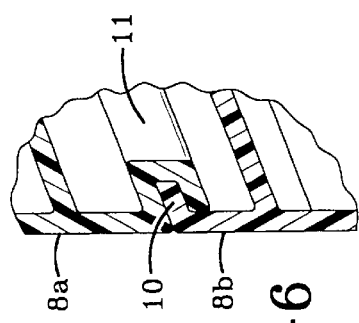
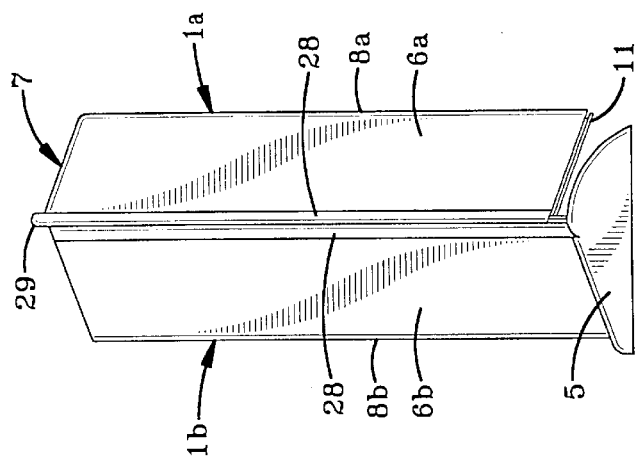
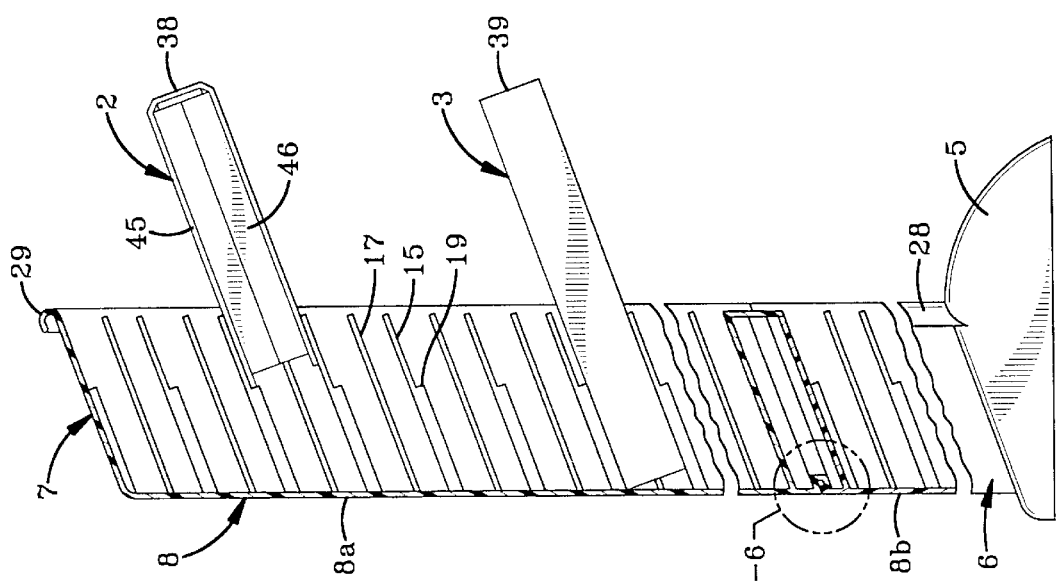
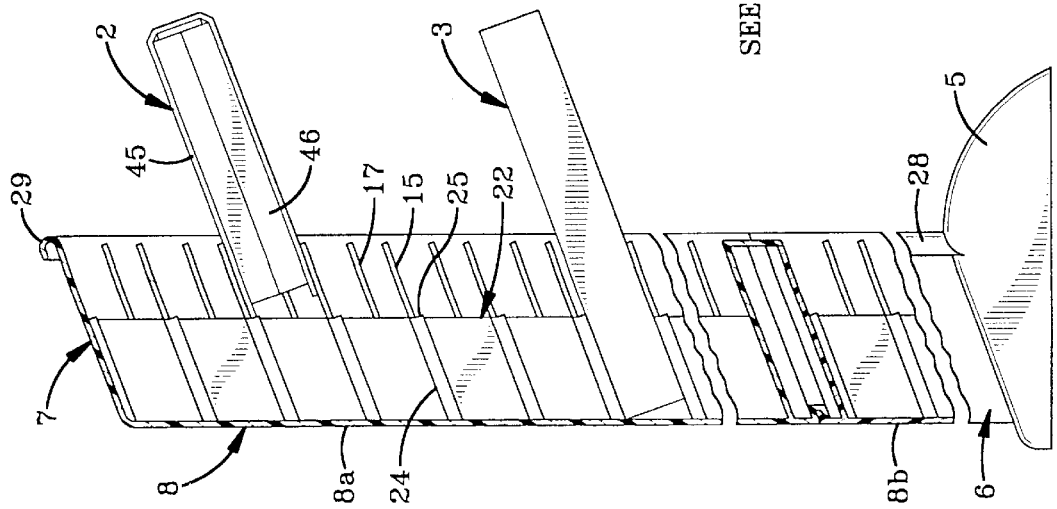

VIDEO CASSETTE STORAGE AND DISPLAY RACK

This is a continuation of application Ser. No. 08/445,219 filed May 18, 1995 which application is now U.S. Pat. No. 5,636,752.

BACKGROUND OF THE INVENTION

TECHNICAL FIELD

The invention relates to storage containers and display racks, and in particular, to a rack for storing and displaying two different size boxes containing video cassettes. More particularly, the invention relates to such a storage rack in which the two different size boxes can be placed interchangeably within the rack with a front end thereof lying in a common vertical plane for ease in viewing the graphics on the end, and to provide a pleasing symmetrical appearance.

BACKGROUND INFORMATION

In recent years, the purchase of video cassettes for permanent ownership by individuals has increased considerably in popularity. Therefore, the need has arisen for a storage and display rack whereby purchasers of the video cassettes can store and display the purchased cassettes in an attractive and pleasing manner. Various storage and display racks have been developed, normally consisting of a plurality of spaced ribs, such as shown in U.S. Patent Nos. 5,238,112 and U.S. Pat. No. Des. 320,707. These prior art racks are suitable for video cassettes which are contained within a parallelpiped-shaped cardboard display sleeve or box having graphics thereon identifying the contents of the video cassettes. These display sleeves are of a uniform size and the cassette boxes will fit easily within the rack with the front ends thereof lying in a symmetrical vertical plane, providing a pleasing appearance to the storage rack and video cassettes contained therein.

However, more recently a slightly larger video cassette storage box has been developed which is formed of a vacuum-formed plastic material. This presents a problem in the storage and display of the video cassettes in their storage sleeves and/or boxes, since the existing storage racks used for the chipboard or cardboard display and storage sleeves will not hold the vacuum-formed storage and display sleeves due to the differences in size. The chipboard display sleeve has a nominal size of 7½ inches ×4½ inches×1 inch, whereas the vacuum-formed storage and display sleeves have a nominal size of 9 inches×5⅜ inches×1¼ inch.

Therefore, the purchasers of video cassettes, in order to store and display these two different sizes of video cassette boxes, are required to purchase two different size racks. However, many individuals would prefer to have only a single rack which will store and display both sizes of video cassette boxes in random order, yet provide a pleasing appearance. In particular, the rack should be able to store these two different sizes of cassette boxes, whereby the front exposed ends of the boxes lie in a common, generally vertical plane, for ease of inspection and for presenting an attractive appearance.

Therefore, the need exists for a storage and display rack adapted to receive two different sizes of video cassette boxes, which boxes can be stored in a random fashion within the rack, yet which enables the front ends of the boxes to be readily visible for reviewing the contents of the boxes, and which enables the front ends of the boxes to lie in a symmetrical vertical plane, providing a pleasing appearance to the rack and stored boxes.

SUMMARY OF THE INVENTION

Objectives of the invention include providing a video cassette storage and display rack adapted to receive two different sizes of video cassette storage boxes, which boxes can be stored in a random fashion within the rack while enabling the front ends of the boxes to be easily visible for reading the contents of the video cassettes stored therein, wherein the front ends align in a vertical plane, providing a pleasing appearance to the rack and stored video cassette boxes.

Another objective of the invention is to provide such a storage and display rack which can be mass produced by the injection molding of two integral one-piece members which can be placed in juxtaposition for ease of shipment and storage, and then assembled easily together by a snap-fit or slide-fit engagement, after removal from the shipping box, for subsequent use by the consumer.

A still further objective of the invention is to provide such a storage and display rack having a plurality of storage spaces which are adapted for storing either size of video cassette box so that the rack may be filled to capacity with only one size box or a combination of both size boxes.

Still another objective of the invention is to provide such a rack which, when be filled to capacity with one or both size boxes, does not interfere with the visual inspection of the contents of the boxes, nor interfere with the easy removal of the boxes from the rack.

Another objective of the invention is to provide such a storage and display rack which is economical to manufacture, durable in use, easy to ship and assemble, and is aesthetically attractive.

These objectives and advantages are obtained by the video cassette storage and display rack of the present invention, the general nature of which may be stated as including a base; a pair of spaced side walls mounted on and extending upwardly from the base, forming a storage chamber therebetween, and having an open front providing access into said storage chamber; a partition extending between the pair of side walls and located substantially equidistant from each of said side walls and dividing the storage chamber into a pair of storage compartments; a plurality of vertically spaced, elongated first ribs formed on the side walls and extending toward the open front of the rack, and into the storage chamber; a plurality of vertically spaced, second ribs formed on the partition; and stop means for predetermining the distance of insertion of the video cassette boxes into the storage chamber.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 4 is a fragmentary longitudinal sectional view taken on line 4—4, FIG. 3, showing storage of the two different sizes of video cassette boxes;

FIG. 5 is a fragmentary longitudinal sectional view taken on line 5—5, FIG. 3, showing storage of the two different sizes of video cassette boxes;

FIG. 6 is an enlarged fragmentary sectional view of the encircled portion of FIG. 5; and FIG. 7 is a reduced diagrammatic side elevational view showing the two one-piece members of the rack in juxtaposition for storage and shipment.

Similar numerals refer to similar parts throughout the drawings.

DESCRIPTION OF THE PREFERRED EMBODIMENT

Figure 1:
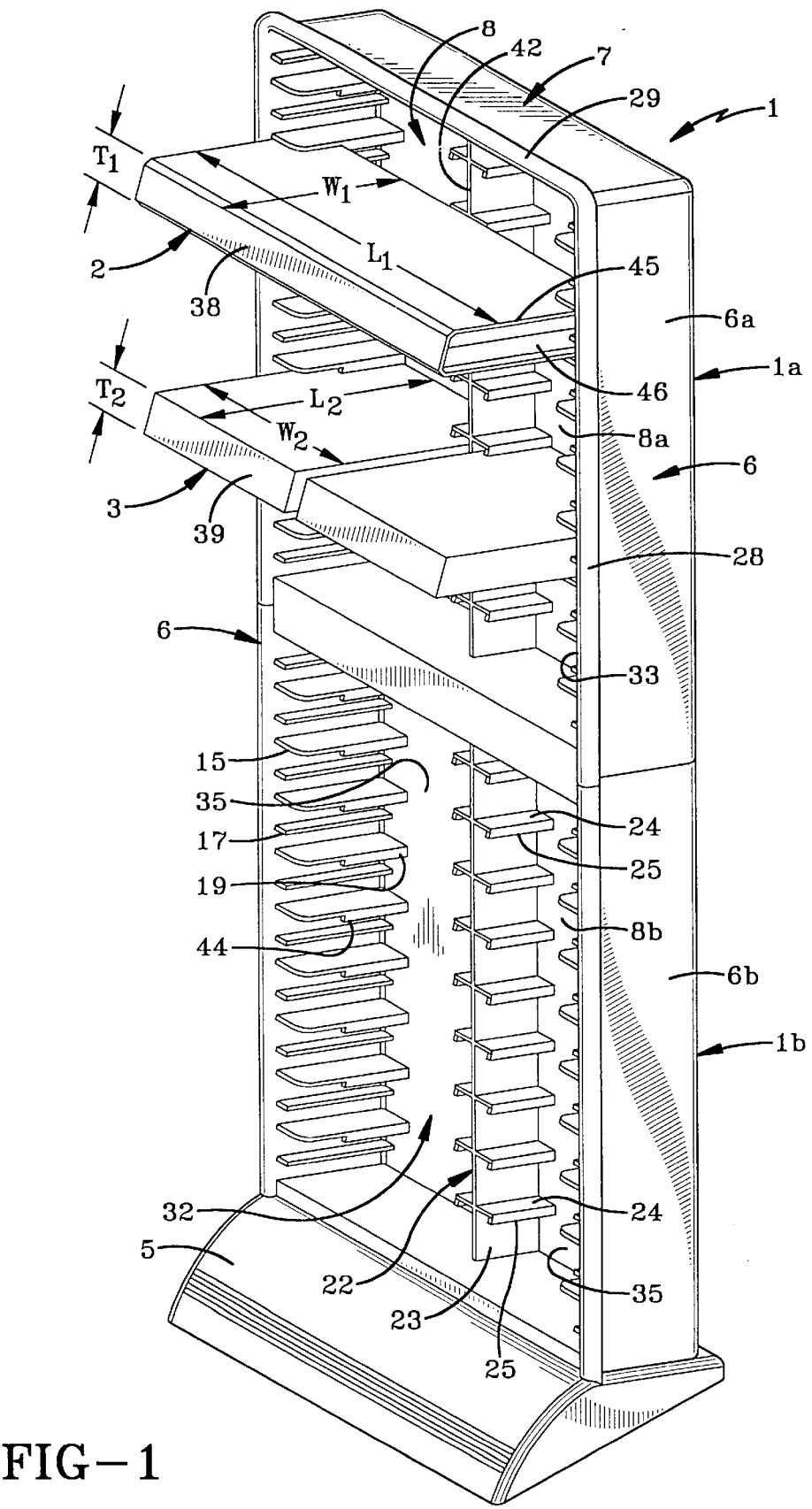
FIG. 1 is a front perspective view of the storage and display rack of the present invention, with two different sizes of video cassette boxes stored therein.

The video cassette storage and display rack of the present invention is indicated generally at 1, and is shown in FIG. 1, storing and displaying two different sizes of video cassette boxes, indicated generally at 2 and 3. Display box 2 is the larger vacuum-formed plastic box and box 3 is the chipboard or cardboard sleeve or box, both of which have a parallelpiped configuration, as shown in FIG. 1.

Rack 1 includes a base 5 and a pair of spaced parallel upwardly extending side walls, indicated generally at 6. Rack 1 further includes a top wall 7 and a back wall 8. In the preferred embodiment, rack 1 is formed by upper and lower sections 1a and 1b. Upper section 1a is an integral one-piece member including top wall 7, upper portions 6a of side walls 6, and an upper portion 8a of back wall 8. Lower section 1b of the display rack is formed as an integral one-piece member consisting of lower portions 6b of side walls 6, a lower portion 8b of back wall 8, and base 5. This two-piece assembly enables the individual upper and lower sections 1a and 1b to be mass produced relatively inexpensively by injection molding. It also enables the upper and lower sections to be placed in juxtaposition with each other when separated, as shown in FIG. 7, enabling the same to be placed in a convenient sized box for storage and shipment until ready for assembly by the purchaser or for display in a retail establishment.

One manner of assembling the upper and lower sections together is shown in FIG. 6. An inwardly extending projection 10 is formed around the top edge of the lower section, which is snap-fitted into a U-shaped channel 11 formed along the bottom edge of the upper section. Projection 10 and channel 11 are formed along both the side walls and back wall portions of the respective sections. This enables the upper and lower sections 1a and 1b to be snap-fitted together easily after removal from the shipping box. Other types of connections may be utilized than the projection/channel configuration shown in FIG. 6. Various types of detents could be formed on one of the sections, which are snap-fitted into recesses or openings formed in the other section, or various arrangements of parallel ribs and intervening ribs could be formed on both sections for slidably joining the two sections together without affecting the concept of the invention.

In accordance with the invention, a plurality of first ribs 15 are formed along the inside surface of both side walls 6 in a vertically spaced parallel relationship, preferably at an angle of approximately 20° to the horizontal, as shown particularly in FIGS. 4 and 5. A plurality of third ribs 17 are formed intermediate adjacent pairs of first ribs 15 on side walls 6 and extend throughout the longitudinal length thereof. Ribs 15 and 17 preferably have the same longitudinal length, as shown particularly in FIG. 1, with the width of first ribs 15 being approximately twice the width of ribs 17. Each rib 15 preferably is provided with a downwardly extending flange 19, the function of which is discussed further below.

In accordance with another feature of the invention, a partition, indicated generally at 22, is formed integrally with back wall 8 and extends longitudinally throughout the length of rack 1 equidistant between and parallel with side walls 6. Partition 22 includes a vertical wall 23 and a plurality of second ribs 24 which extend outwardly from both sides of wall 23. Ribs 24 each terminate in a downwardly extending flange 25 which has a downwardly projecting length equal to that of flanges 19 of ribs 15.

The front edges 28 of side walls 6 and front edge 29 of top wall 7 terminate in a reverse roll configuration, as shown particularly in FIGS. 4 and 5, to provide rigidity to the rack. Base 5, side walls 6, top wall 7, and back wall 8 define and form a storage chamber 32 having an open front 33 defined by front edges 28 and 29 which provides access into storage chamber 32. Partition 22 divides storage chamber 32 into a pair of side-by-side storage compartments 35.

As indicated previously, the vacuum formed video cassette display box 2 has a length $L_1$ of 9 inches, a width $W_1$ of 5⅜ inches, and a thickness $T_1$ of 1¼ inches. The chipboard display box or sleeve 3 has length $L_2$ of 7½ inches, a width $W_2$ of 4¼ inches, and thickness $T_2$ of 1 inch. The unique arrangement of first and third ribs 15 and 17, and their placement on side walls 6, and second ribs 24 of partition 22, enables both of these sizes of video cassette boxes to be stored in a random order within the rack in a secured position, with front ends 38 and 39 of boxes 2 and 3, respectively, readily exposed. These front ends will contain various graphics identifying the contents of the particular video cassette stored therein. Also, as shown particularly in FIG. 3, front ends 38 and 39, regardless of the random order of the storage of the two different size boxes within rack 1, will generally align in a vertical plane. This provides a pleasing and attractive appearance to the storage rack and stored video cassette boxes, and enables the contents to be readily viewed.

Figure 2:
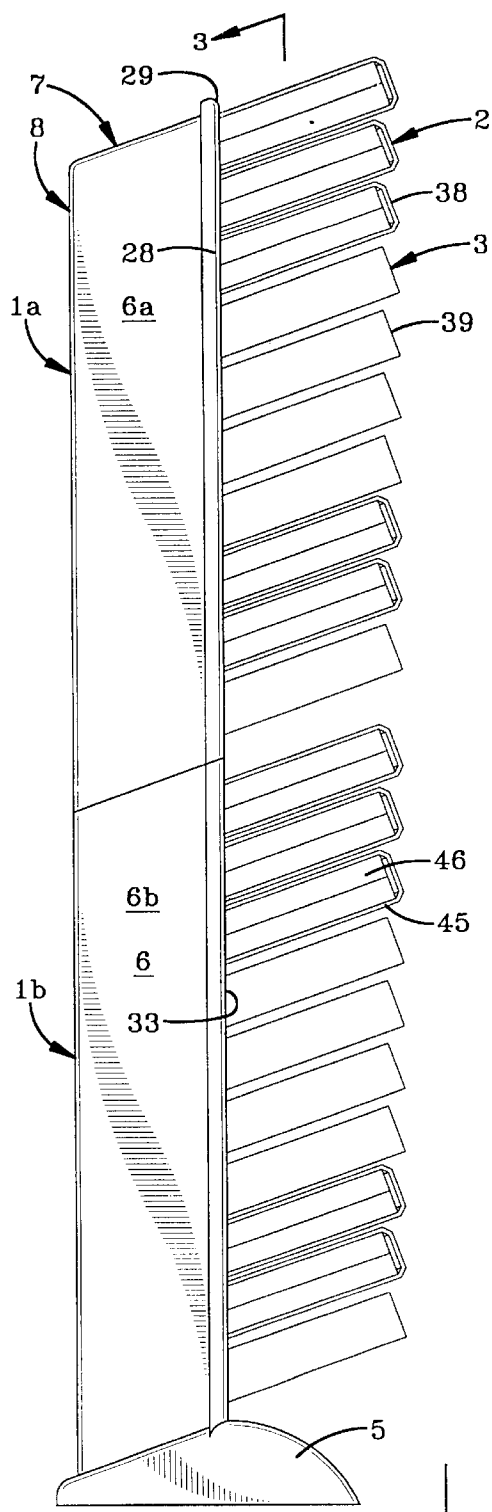
FIG. 2 is a side elevational view of the rack of FIG. 1, completely filled with the two different sizes of video cassette boxes placed in random order within the rack.
Figure 3:
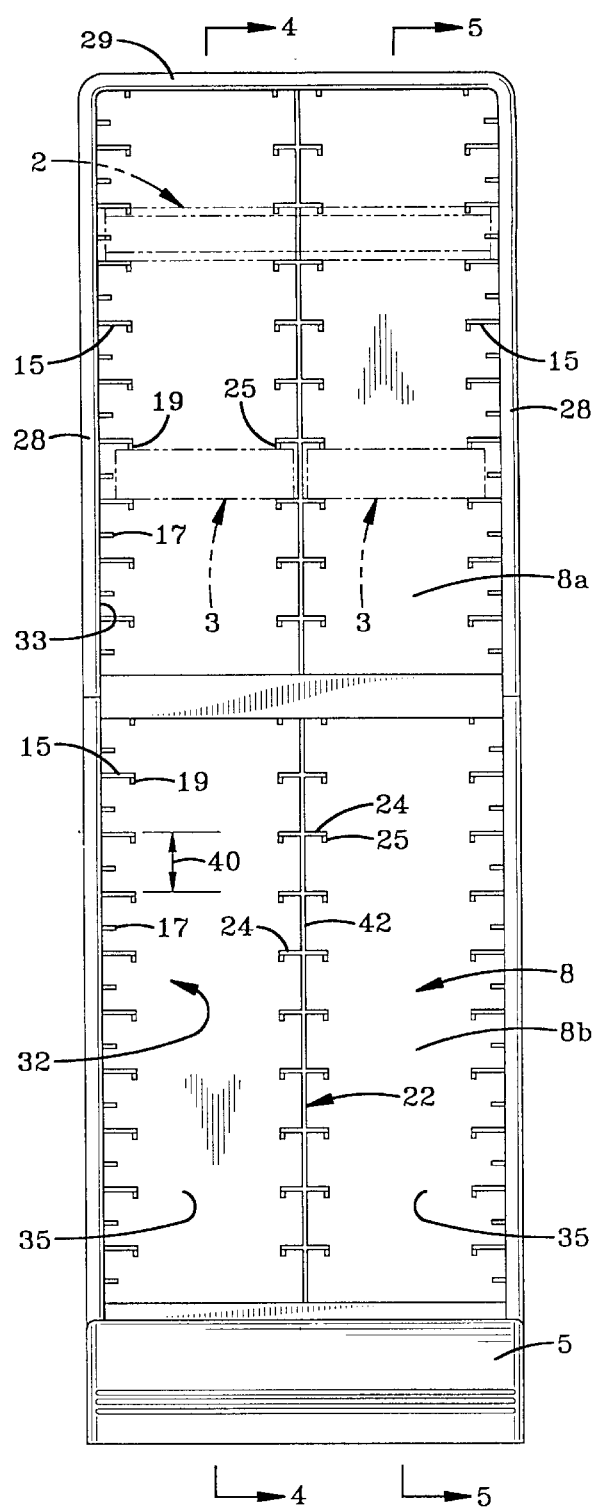
FIG. 3 is a front elevational view of the rack of FIG. 1, with the two different sizes of video cassette boxes shown in dot-dash lines being stored therein.

The manner of use of rack 1 in storing boxes 2 and 3 is shown particularly in FIGS. 1–5. As shown in FIG. 3, first ribs 15 on opposite walls 6 lie in a plane, which preferably extends at an angle of approximately 20° with respect to the horizontal, as shown in FIGS. 4 and 5. Spaced pairs of first ribs 15 provide a shelf for receiving a single vacuum-formed display box 2 thereon in a lengthwise relationship, as shown particularly in FIGS. 1 and 3. The vertical distance 40 (FIG. 3) between vertically adjacent ribs 15 is approximately equal to but slightly less than the thickness $T_1$ of box 2. This enables boxes 2 to be slid easily in a lengthwise manner between pairs of ribs 15, and retained thereon in a display position, as shown in FIG. 1. In accordance with another feature of the invention, a front edge 42 of partition wall 23 functions as a stop to determine the depth of insertion of boxes 2 into storage chamber 32 so that front ends 38 thereof are at a predetermined location with respect to rack 1. If desired, front edges 44 of flanges 19 could also function as stops to determine the depth of insertion of boxes 2 into chamber 32.

Video boxes 3 are inserted in a widthwise relationship between a horizontally aligned first rib 15 and an adjacent second rib 24 of partition 22, as shown in FIGS. 1 and 3. Thus, a pair of boxes 3 is placed in a side-by-side width relationship, as shown in FIG. 1, on a side wall rib 15 and a horizontally aligned partition rib 24. Back wall 8 functions as a stop for determining the depth of insertion of video cassette boxes 3 so that front ends 39 thereof are at the same location as are front ends 38 of boxes 2.

Flanges 19 and 25 compensate for the reduced thickness of display box 3 with respect to display box 2, and assist in securely retaining box 3 in storage compartments 35, as shown particularly in FIG. 3. Flanges 19 and 25 have no effect on the storage of thicker display boxes 2, since the flanges are recessed behind or in line with, front edge 42 of partition wall 23.

Vacuum-formed display boxes 2 do not have straight vertical sides as do the chipboard box or sleeve 3, but have peripheral edges 45 which extend outwardly beyond flat sides 46, as shown particularly in FIGS. 1–3. The horizontal distance between side walls 6 or the width of the display rack, is approximately equal to and just slightly larger than $L_1$ of box 2 so that a loose slide-fit engagement is provided therebetween when box 2 is slidably inserted through open front 33 of rack 1 and into storage chamber 32. Third ribs 17 closely align with flat sides 46 of boxes 2 to assist in retaining boxes 2 on their respective supporting ribs. However, the primary function of ribs 17 is to properly position boxes 3 in their respective storage compartments due to width $W_2$ of boxes 3 being slightly smaller than one-half the length of box 2.

It is readily seen that twice as many boxes 3 than boxes 2 can be stored in rack 1. For example, in the rack of the preferred embodiment, forty boxes 3 can be stored or twenty boxes 2, or various combinations thereof, as shown in FIG. 2.

It is also readily understood that a front closure door or doors could be used by increasing the size of the side walls. Also, if desired, base 5 could be formed as a separate component and snap-fitted to the remainder of the rack.

Accordingly, the video cassette storage and display rack of the present invention is simplified, provides an effective, safe, inexpensive, and efficient device which achieves all the enumerated objectives, provides for eliminating difficulties encountered with prior storage and display devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved video cassette storage and display rack is constructed and used, the characteristics of the construction, and the advantageous, new and useful results obtained; the new and useful structures, devices, elements, arrangements, parts and combinations, are set forth in the appended claims.

I claim:

1. A container for storing and displaying a plurality of boxes, wherein the container includes:
   a base;
   a pair of spaced side walls extending from the base and defining a storage chamber therebetween;
   a plurality of first ribs on the side walls and extending into the storage chamber, the first ribs providing a plurality of first storage spaces extending across the storage chamber between the side walls;
   a partition recessed within the storage chamber and extending between and substantially parallel to the side walls; and
   a plurality of second ribs on the partition, the first and second ribs providing a plurality of second storage spaces between the partition and at least one side wall, each of said second storage spaces being located within a first storage space.

2. The container of claim 1 wherein the first ribs are integrally formed with the side walls and the second ribs are integrally formed with the partition.

3. The container of claim 1 wherein the first ribs include flanges descending into the first storage space.

4. The container of claim 1 wherein each element is integrally formed with the container.

5. The container of claim 1 wherein the container is a single integral unit.

6. The container of claim 1 wherein the partition comprises two parallel ribs.

7. The container of claim 1 further including a top wall and a back wall extending between the side walls.

8. A container for storing and displaying a plurality of boxes, wherein the container includes:
   a base;
   a pair of spaced side walls extending from the base and defining a storage chamber therebetween;
   a plurality of first ribs on the side walls and extending into the storage chamber, the first ribs providing a plurality of first storage spaces extending across the storage chamber between the side walls;
   a partition recessed within the storage chamber and extending between and substantially parallel to the side walls;
   a plurality of second ribs on the partition, the first and second ribs providing a plurality of second storage spaces between the partition and at least one side wall, each of said second storage spaces being located within a first storage space; and
   stop means for limiting insertion of the boxes whereby outer ends of the boxes may form a substantially vertical plane.

9. The container of claim 8 wherein each of the first storage spaces is capable of accepting a video cassette box.

10. The container of claim 8 wherein the first ribs are integrally formed with the side walls and the second ribs are integrally formed with the partition.

11. The container of claim 8 wherein the first ribs include flanges descending into the first storage spaces.

12. The container of claim 8 wherein each element is integrally formed with the container.

13. The container of claim 8 wherein the container is a single integral unit.

14. The container of claim 8 wherein the partition comprises two parallel ribs.

15. A container for storing and displaying a plurality of boxes, wherein the container includes:
   a base;
   a pair of spaced side walls extending from the base and defining a storage chamber therebetween;
   a plurality of first ribs on the side walls and extending into the storage chamber, the first ribs providing a plurality of first storage spaces extending across the storage chamber between the side walls, each first rib including a flange descending into the first storage space; and
   a plurality of second ribs located intermediate the side walls and recessed inwardly within the storage chamber, the first and second ribs providing a plurality of second storage spaces, each of said second storage spaces being located within a first storage space.

16. The container of claim 15 wherein the first ribs are integrally formed with the side walls.

17. The container of claim 15 further comprising a stop means for limiting insertion of the boxes whereby outer ends of the boxes may form a substantially vertical plane.

* * * * *